Patented Oct. 13, 1931

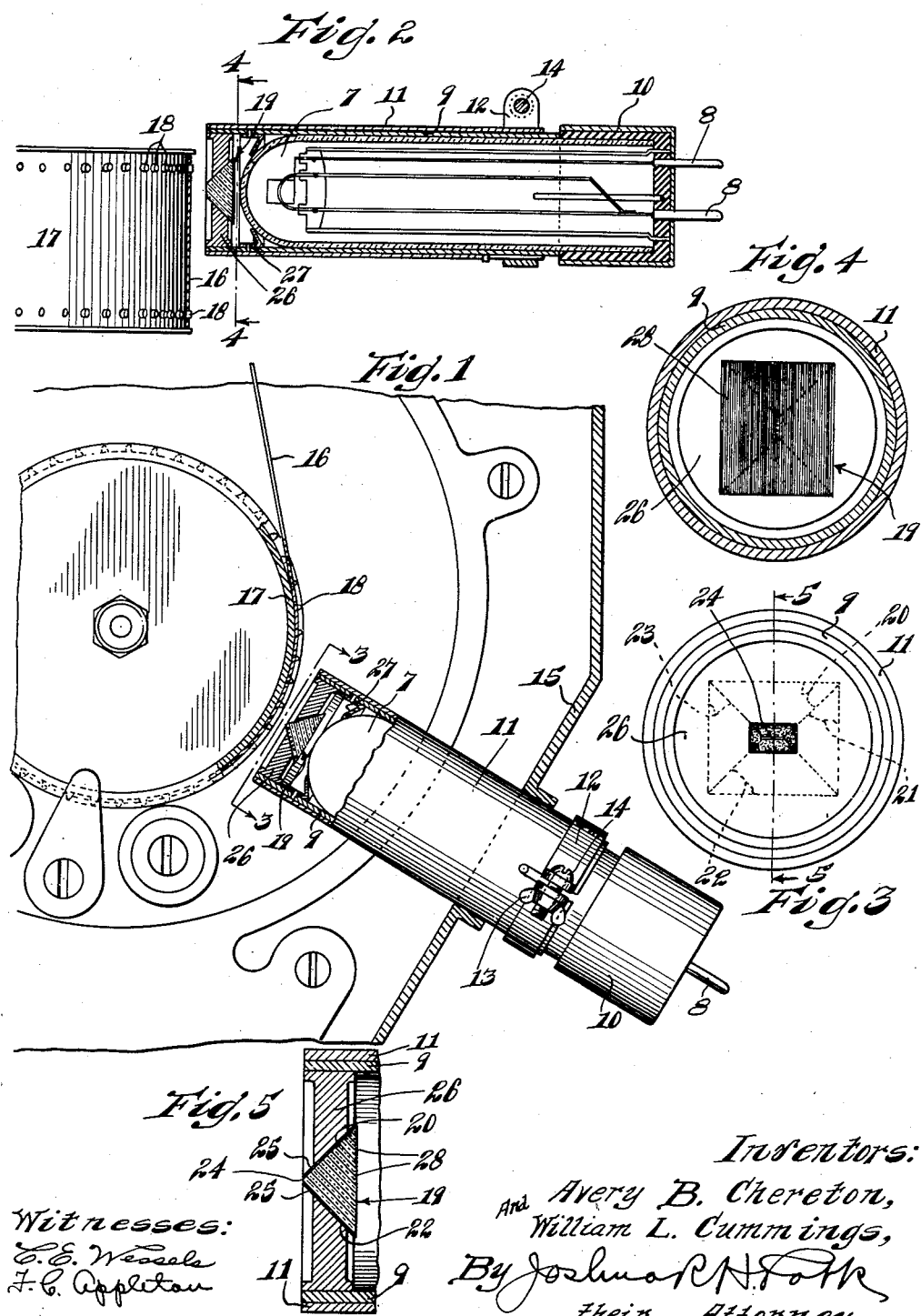

1,826,924

UNITED STATES PATENT OFFICE

AVERY B. CHERETON, OF CHICAGO, AND WILLIAM L. CUMMINGS, OF BERWYN, ILLINOIS, ASSIGNORS TO THE VITAGLO CORPORATION, A CORPORATION OF DELAWARE

PHOTOGRAPHIC SOUND RECORDING MEANS

Application filed April 26, 1930. Serial No. 447,750.

This invention relates to photographic sound recording means especially adapted for the photographic recording of variations in sound intensity upon the film of a motion picture camera.

In an apparatus of this character, a special form of light is employed which is connected to a sound receiving apparatus and the light, which is mounted within the camera, is adapted to vary in intensity in accordance with variations in the intensity of the sound received in the receiving apparatus. Thus variations in the intensity of light produce a variable intensity of exposure upon the film on a relatively narrow sound track simultaneously with the taking of the picture. For sound recording purposes there has heretofore been interposed between the sound track portion of the film and the sound responsive light a disc member provided with an aperture approximately one one-thousandth of an inch wide, by seven sixty-fourths of an inch long. In order to transform the variations in intensity of light emitted with the required degree of selectivity or accuracy, it has been necessary to position the disc with the aperture in as close position to the film as possible without, however, creating actual contact. This delicate adjustment has been accomplished by means of a micrometer device, and has been objectionable for several reasons, among which may be enumerated the great loss of time in repeatedly adjusting the parts, the defective recording in case of slight inaccuracy in making the adjustment, and the liability of injury to the film or injury or destruction to the delicate disc member in case small particles of foreign matter are carried by the film, as often occurs.

An object of the present invention is the provision of an improved light screen or grating of special construction adapted to be interposed between the film and light, which is not required to be positioned directly adjacent the film or in relatively close contact therewith, but may be spaced from the film a slight distance without affecting accurate recording and thus eliminating the many objectionable features of the former types. More specifically, the invention contemplates the provision of an improved light grating for the purpose described of special construction and whereby the light rays are not diffused after passage through the aperture, but are concentrated and emitted in a ribbon-like beam of light corresponding in cross-sectional area to the size of the aperture.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a side elevational view, partly in section, of a portion of a motion picture camera with an embodiment of the present invention associated therewith;

Fig. 2 is a plan sectional view of the device in association with a sound recording light and motion picture film sprocket;

Fig. 3 is an end view, taken substantially on the line 3—3 of Fig. 1;

Fig. 4 is a rear veiw of the light grating of the invention, taken on the line 4—4 of Fig. 2; and Fig. 5 is a sectional view, taken on the line 5—5 of Fig. 3.

As illustrated in the drawings, the preferred embodiment of the invention is illustrated in operative association with a light 7 having the variable intensity properties described and provided with terminal prongs 8 for connection to a socket member. Detailed description of the light and sound receiving apparatus is rendered unnecessary by reason of the fact that the present invention does not relate to these parts, but to the important confining and recording of the light rays. The light 7 is preferably enclosed within a tubular member 9 adapted to extend in contact with the light base 10 and also to serve as a support for the light grating. An outer tubular member 11 may be mounted in the position shown in Fig. 1 adjacent the rear lower corner of a motion picture camera, and by this arrangement the light may be withdrawn when not in use, or the tubular member 9 together with the light may be withdrawn. When in use the respective parts may be held in position by means of a clamp 12 having a wing nut 13 threaded on bolt 14 whereby the outer tubular member 11 is slightly compressed.

In the preferred mounting shown, the member 11 is mounted in the wall portion 15 of the camera and the forward extremity is spaced a short distance from the film 16 which is carried on the film feed sprocket 17 by means of sprocket teeth 18. The light grating of the present invention comprises a pyramidal shaped member of glass, quartz or other material possessing great transparency, having a base 19 and four inclined surfaces 20, 21, 22 and 23, each of which is disposed at an angle of substantially forty-five degrees to the base 19 and the inner edges of which terminate in a flat slit 24 which is preferably one one-thousandth of an inch in width, by seven sixty-fourths of an inch in length for general recording purposes. It is understood that these dimensions may be varied, especially the length of the slit, to suit different recording requirements, but a width of one one-thousandth of an inch has been found satisfactory in general use. The four inclined surfaces 20, 21, 22 and 23 are covered either with an opaque material, or they may be silvered, as shown at 25 in Fig. 5, leaving as a light emitting opening only the slit 24 at the apex of the pyramidal formation, and the member is then mounted in a suitable holder 26 preferably having a circular periphery for mounting in the forward end of the tubular member 9. Member 9 is preferably provided with an internal annular flange 27 adapted to space the end of light 7 from contact with the grating, and in mounting for use, slit 24 is disposed transversely of the film for registry with the sound track portion, as shown in Fig. 2. Thus it will be seen that the light grating is of a prismatic contour, and the base 19 is provided with a multiplicity of scores or grooves 28, as shown in Figs. 4 and 5. These scores or grooves may be either cut by a cutting implement, such as a diamond, or may be molded, and preferably number two thousand or more to the inch. Although imperceptible to the naked eye, these grooves when formed are V-shaped to produce a multitude of inclined surfaces on the base 19 which have a prismatic effect upon rays reflected from the side surfaces 20, 21, 22 and 23. Further, the scores preferably extend in a direction parallel to the longitudinal direction of the slit 24, and by this formation the light rays emitting from the light or lamp 7 are concentrated within the prismatic member and reflected within the member innumerable times through the contributing reflecting surfaces of the scores or grooves 28, so that when emitted through the slit opening 24 the light is maintained and continuous in a ribbon-like beam of the same cross-sectional area as the size of the slit 24, which in the preferred embodiment illustrated is one one-thousandth of an inch in width, by seven sixty-fourths of an inch in length for standard practice. By reason of this result, and the elimination of diffusion it is not essential that the slit opening be maintained in as close contact with the film as possible, but the light screening or grating member may be spaced from the film approximately one-eighth of an inch, which is sufficient to overcome all of the objections above enumerated in connection with former devices; or the device of the invention may be spaced even a greater distance if desired. It will be understood that the number of scorings upon the base of the grating member may be increased if desired, but in this connection it has been found that the width of the light emitting slit described and the provision of approximately two thousand scorings per inch render the apparatus sufficiently selective for the reproduction of sound waves having frequencies within the audible range of the human ear. In the apparatus illustrated, the picture portion of the film 16 has been exposed and after engagement by the film said sprocket 17 is delivered to an exposed film compartment.

It will be understood that the sound recording device may be installed in any suitable position, but the arrangement shown is convenient and satisfactory and the discrepancy between the picture exposure and sound exposure is compensated for in projection. As the film travels normally at a rate of approximately ninety feet per minute, light fluctuations from the light 7 corresponding to sound variations in the sound receiving apparatus are recorded upon the film sound track in the manner described.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. In sound recording means having a light subject to variable intensities in accordance with sound variations and a film having a film track upon which said light variations are recorded, the combination of a light grating interposed between said light and film, said light grating composed of a light transmitting material of prismatic formation having inclined side portions terminating in a narrow light emitting slit, and a base portion provided with a plurality of relatively small scorings of the order of two thousand per inch.

2. In sound recording means having a light subject to variable intensities in accordance with sound variations and a film having a film track upon which said light variations are recorded, the combination of a light grating interposed between said light and film, said light grating composed of a light transmitting material of prismatic formation having inclined side portions terminating in a narrow light emitting slit, and a base portion provided with a plurality of relatively small scorings of the order of two thousand per inch, said slit being substantially one one-thousandth of an inch in width and of a length corresponding to the width of said sound track.

3. In sound recording means having a light subject to variable intensities in accordance with sound variations and a film having a film track upon which said light variations are recorded, the combination of a light grating interposed between said light and film, said light grating composed of a light transmitting material of prismatic formation having inclined side portions terminating in a narrow light emitting slit, and a base portion provided with a plurality of relatively small scorings of the order of two thousand per inch, said inclined side portions covered with an opaque material.

4. In sound recording means having a light subject to variable intensities in accordance with sound variations and a film having a film track upon which said light variations are recorded, the combination of a light grating interposed between said light and film, said light grating composed of a light transmitting material of prismatic formation having inclined side portions terminating in a narrow light emitting slit, and a base portion provided with a plurality of relatively small scorings of the order of two thousand per inch, said slit being substantially one one-thousandth of an inch in width and of a length corresponding to the width of said sound track, said inclined side portions covered with an opaque material.

5. In sound recording means having a light subject to variable intensities in accordance with sound variations and a film having a film track upon which said light variations are recorded, the combination of a light grating interposed between said light and film, said light grating composed of a light transmitting material of pyramidal formation having a base portion disposed toward said light and four inclined side portions terminating in a light emitting slit adapted to be spaced from said film, said base portion provided with a plurality of relatively small scorings.

6. In sound recording means having a light subject to variable intensities in accordance with sound variations and a film having a film track upon which said light variations are recorded, the combination of a light grating interposed between said light and film, said light grating composed of a light transmitting material of pyramidal formation having a base portion disposed toward said light and four inclined side portions terminating in a light emitting slit adapted to be spaced from said film, said base portion provided with a plurality of relatively small scorings, said scorings extending in a direction parallel to said slit and numbering approximately two thousand per inch.

7. In sound recording means having a light subject to variable intensities in accordance with sound variations and a film having a film track upon which said light variations are recorded, the combination of a light grating interposed between said light and film, said light grating composed of a light transmitting material of pyramidal formation having a base portion disposed toward said light and four inclined side portions terminating in a light emitting slit adapted to be spaced from said film, said base portion provided with a plurality of relatively small scorings, and said inclined side portions covered with an opaque material.

8. In sound recording means having a light subject to variable intensities in accordance with sound variations and a film having a film track upon which said light variations are recorded, the combination of a light grating interposed between said light and film, said light grating composed of a light transmitting material of pyramidal formation having a base portion disposed toward said light and four inclined side portions terminating in a light emitting slit adapted to be spaced from said film, said base portion provided with a plurality of relatively small scorings, said scorings extending in a direction parallel to said slit and numbering approximately two thousand per inch, and said inclined side portions covered with an opaque material.

9. A light grating of the character described comprising a body of light transmitting material, said body having a base portion and four inclined side portions, said side portions terminating in a narrow slit, said inclined side portions covered with an opaque material, and said base portion provided with a plurality of relatively small grooves.

In testimony whereof we have signed our names to this specification.

AVERY B. CHERETON.
WILLIAM L. CUMMINGS.